United States Patent [19]

Limberg

[11] Patent Number: 5,786,870
[45] Date of Patent: Jul. 28, 1998

[54] NTSC VIDEO SIGNAL RECEIVERS WITH REDUCED SENSITIVITY TO INTERFERENCE FROM CO-CHANNEL DIGITAL TELEVISION SIGNALS

[75] Inventor: Allen LeRoy Limberg, Vienna, Va.

[73] Assignee: Samsung Electronics Co., Ltd., Suwon, Rep. of Korea

[21] Appl. No.: 882,541

[22] Filed: Jun. 25, 1997

Related U.S. Application Data

[63] Continuation-in-part of Ser. No. 821,944, Mar. 21, 1997.
[51] Int. Cl.[6] .................................................. H04N 5/21
[52] U.S. Cl. ........................ 348/607; 348/555; 348/726
[58] Field of Search ............................ 348/21, 470, 607, 348/725, 726, 555; 328/346, 348, 350

[56] References Cited

U.S. PATENT DOCUMENTS

| 5,122,879 | 6/1992 | Ito ........................................... 348/607 |
| 5,715,012 | 2/1998 | Patel et al. ............................. 348/558 |

Primary Examiner—Victor R. Kostak

[57] ABSTRACT

A video signal receiver with reduced sensitivity to interference from co-channel digital TV signals includes circuitry for selecting a vestigial sideband amplitude-modulation signal descriptive of a video signal, converting the selected VSB AM signal to an intermediate frequency signal, and amplifying the IF signal to provide an amplified IF signal. The VSB AM signal is selected from any single one of a plurality of channels which can contain co-channel interference from a digital television signal. The amplified IF signal is synchronously detected with respect to video carrier frequency for generating an in-phase synchronous detection response and for generating a quadrature-phase synchronous detection response. All frequency components of the quadrature-phase synchronous detection response above a prescribed frequency are phase shifted substantially 90° and are linearly combined with in-phase synchronous detection response for recovering lower frequency portions of the video signal, substantially free of artifacts from any co-channel interfering digital television signal. In some embodiments of the video signal receiver higher frequency portions of the video signal described in the full sideband of the VSB AM signal, but not in its vestigial sideband, are recovered by synchronously detecting the VSB AM signal after selective filtering to remove the pilot carrier signal component of any co-channel digital TV signal. The selective filtering avoids any artifact of such pilot carrier signal being generated when recovering higher frequency portions of the video signal. The lower and the higher frequency portions of the video signal are combined to obtain a fullband video signal.

20 Claims, 10 Drawing Sheets

NTSC VIDEO SIGNAL RECEIVERS WITH REDUCED SENSITIVITY TO INTERFERENCE FROM CO-CHANNEL DIGITAL TELEVISION SIGNALS

This is a continuation-in-part of patent application Ser. No. 08/821,944 filed 21 Mar. 1997.

The invention relates to NTSC television signal receivers and, more particularly, to improvements in such receivers for rendering them substantially less sensitive to interference from co-channel digital television signals.

BACKGROUND OF THE INVENTION

U.S. Pat. No. 5,122,879 issued 16 Jun. 1992 to Katsu Ito and entitled "TELEVISION SYNCHRONOUS RECEIVER WITH PHASE SHIFTER FOR REDUCING INTERFERENCE FROM A LOWER ADJACENT CHANNEL" describes a receiver for the video portion of an analog television signal that synchronously detects received analog television signal both in-phase and quadrature-phase. To improve noise figure by avoiding amplifiers with varactor diode tuning, the Ito receiver synchrodynes the radio-frequency (RF) amplifier response directly to baseband, so an adjacent lower channel may appear as an image. The quadrature-phase synchronous detection response is phase shifted 90° at all video frequencies above 750 kHz and linearly combined with the in-phase synchronous detection response to suppress image frequency components translated to baseband during synchronous detection of the video portion of the received NTSC signal. In U.S. Pat. No. 5,122,879 Ito does not disclose the fact that this procedure also cancels the video components above 750 kHz. The attendant loss of luminance high frequencies is acceptable in small-viewing-screen television receivers, however, such as those used in wrist watches.

By modifying the band-limited video signal receiver described by Ito so that the quadrature-phase synchronous detection response is phase shifted 90° at all video frequencies, artifacts of co-channel interfering digital television signals are removed from the band-limited baseband NTSC signal, it is here pointed out. Presuming that the time constant of the automatic gain control circuitry in the receiver is a few horizontal scan lines, the quadrature-phase synchronous detection response need be phase shifted 90° only for frequencies above a few kilohertz to keep artifacts of co-channel interfering digital television signals in the band-limited video signal from being visible on the television viewing screen or interfering with horizontal synchronization.

SUMMARY OF THE INVENTION

A video signal receiver with reduced sensitivity to interference from co-channel digital television signals is constructed in accordance with a principal aspect of the invention to include input circuitry for selecting a vestigial sideband amplitude-modulation signal descriptive of a video signal, converting the selected vestigial sideband amplitude-modulation signal to an intermediate frequency signal, and amplifying the intermediate frequency signal to provide an amplified intermediate frequency signal. The vestigial sideband amplitude-modulation signal as originally received includes a video carrier and full sideband in addition to a vestigial sideband. The vestigial sideband amplitude-modulation signal is selected from any single one of a plurality of channels at least one of which is subject to containing at times co-channel interference from a digital television signal. Video synchrodyning circuitry synchronously detects the amplified intermediate frequency signal with respect to video carrier signal, for generating an in-phase synchronous detection response and for generating a quadrature-phase synchronous detection response. All frequency components of the quadrature-phase synchronous detection response above a prescribed frequency are phase shifted by substantially 90° by an inverse Hilbert transform filter and are linearly combined with suitably delayed in-phase synchronous detection response for recovering lower frequency portions of the video signal described both in the full sideband and the vestigial sideband of the vestigial sideband amplitude-modulation signal, substantially free of artifacts from any co-channel interfering digital television signal. The term "linear combiner" as used in this specification and the claims appended thereto is a generic term for "additive combiner", or adder, and for "differential combiner", or subtractor.

In accordance with further aspects of the invention, the video signal receiver includes circuitry for recovering higher frequency portions of the video signal described in the full sideband of the vestigial sideband amplitude-modulation signal, but not in its vestigial sideband. The vestigial sideband amplitude-modulation signal as supplied to this circuitry for recovering higher frequency portions of the video signal is selectively filtered to remove the pilot carrier signal component of any co-channel digital television signal. This is done to avoid any artifact of such pilot carrier signal being generated when recovering higher frequency portions of the video signal. The video signal receiver further includes circuitry for linearly combining those higher frequency portions of the video signal with the lower frequency portions of the video signal, which are described both in the full sideband and the vestigial sideband of the vestigial sideband amplitude-modulation signal, and which are substantially free of artifacts from any co-channel interfering digital television signal.

DETAILED DESCRIPTION

Figure 1:
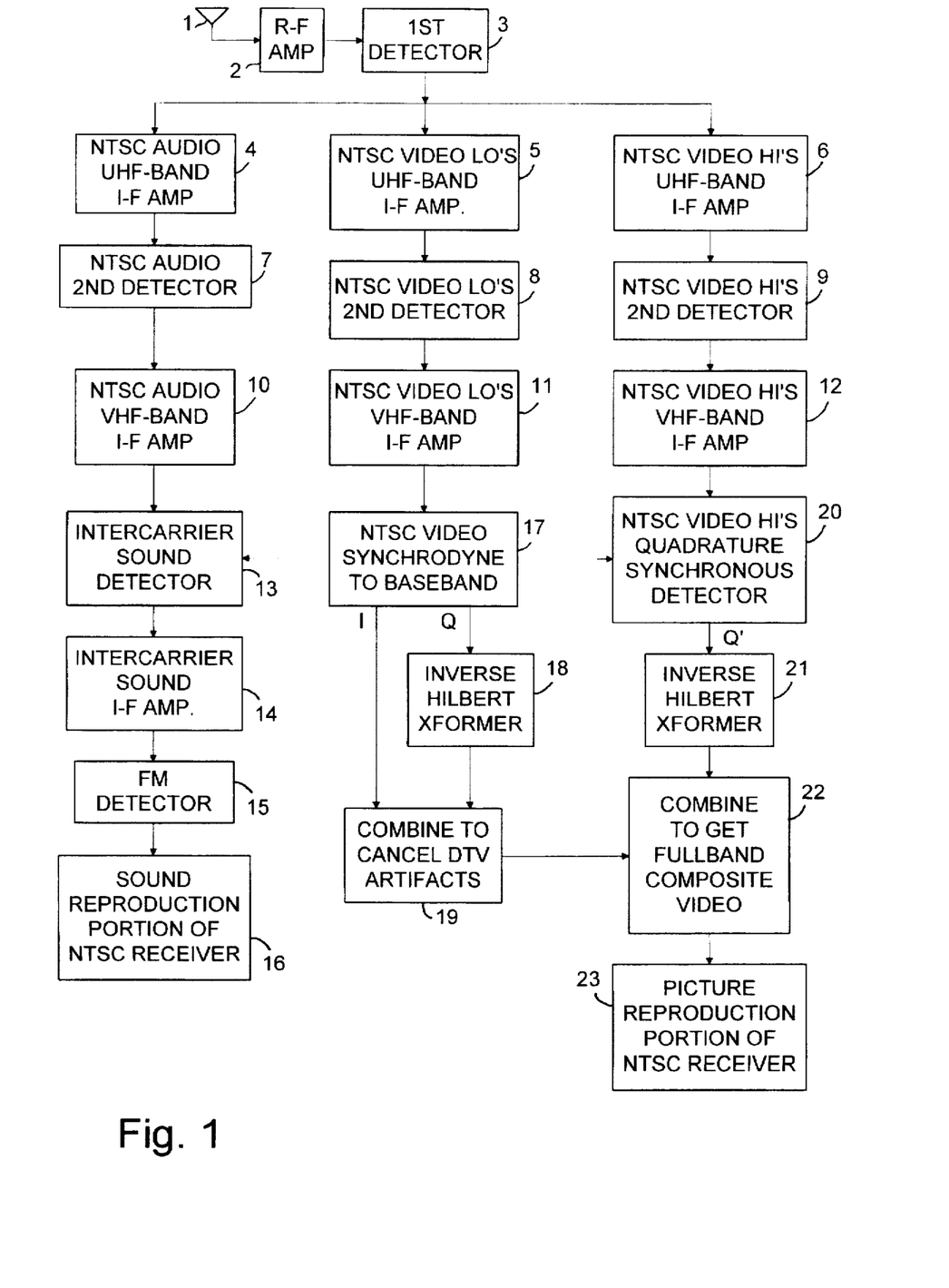
FIGS. 1, 2, 3, 4, 5, 6 and 7 are each a schematic diagram of a respective television receiver that is capable of receiving NTSC analog TV signals as well as DTV signals, which receiver employs the method of the invention for detecting the presence in DTV signals of co-channel interfering NTSC analog TV signals.

FIG. 1 shows a television receiver that is capable of receiving NTSC analog TV signals as well as DTV signals. Over-the-air type television broadcasting signals as received by an antenna 1 are amplified by an adjustably tuned radio-frequency amplifier 2 and supplied to a first detector 3. The RF amplifier 2 and the first detector 3 have adjustable tuning and together function as a tuner for selecting said digital television signal from one of channels at different locations in a frequency band. The first detector 3 includes a first local oscillator supplying first local oscillations tunable over a frequency range above the ultra-high-frequency (UHF) TV broadcast band and a first mixer for mixing the first local oscillations with a TV signal selected by the adjustably tuned RF amplifier 2 for upconverting the selected TV signal to generate a UHF intermediate-frequency signal in a 6-MHz-wide UHF intermediate-frequency band located at frequencies above the assigned channels in the UHF TV broadcast band.

The first detector 3 supplies the high-IF-band signal to a UHF-band intermediate-frequency amplifier 4 for NTSC audio signal, to a UHF-band intermediate-frequency amplifier 5 for fullband NTSC video signal, and to a UHF-band intermediate-frequency amplifier 6 for NTSC video highs signal. The responses of the UHF-band IF amplifiers 4, 5 and 6 are supplied to respective second detectors 7, 8 and 9 to be downconverted to respective VHF-band intermediate-frequency signals in a VHF band below the very high frequencies assigned as TV broadcast channels. The second detectors 7, 8 and 9 share a common second local oscillator for generating second local oscillations and have respective second mixers for mixing those second local oscillations with the responses of the UHF-band IF amplifiers 4, 5 and 6, respectively. The VHF-band IF signals from the second detector detectors 7, 8 and 9 are respectively supplied to a VHF-band intermediate-frequency amplifier 10 for NTSC audio signal, to a VHF-band intermediate frequency amplifier 11 for fullband NTSC video signal, and to a VHF-band intermediate frequency amplifier 12 for NTSC video highs signal.

The UHF-band IF amplifiers 4, 5 and 6 include surface-acoustic-wave (SAW) filters for UHF-IF-band NTSC audio signal, for UHF-IF-band fullband NTSC video signal and for UHF-IF-band NTSC video highs signal, respectively. SAW filters with steep rejection skirts, but with pass bands having linear group delay and flat amplitude response, are more easily implemented at UHF than at VHF. This is the reason for preferring to determine overall IF response for UHF-IF-band NTSC audio signal, for UHF-IF-band fullband NTSC video signal and for UHF-IF-band NTSC video highs signal in the UHF IF band rather than in the VHF IF band.

The SAW filter in the IF amplifier 5 for determining overall IF response for fullband NTSC video signal preferably has substantially flat amplitude response for those portions of the VSB AM signal ranging between frequencies 500 kHz to at least 3.5 MHz above the lower limit of the 6-MHz-wide TV broadcast channel as that VSB AM signal is translated to the UHF IF band, that rejects in-channel and adjacent-channel NTSC audio signals, and that has substantially linear phase response throughout its passband. The SAW filter in the IF amplifier 5 may suppress or reject the pilot carrier of any co-channel interfering ATSC DTV signal, so long as linear phase response is maintained to 750 kHz from NTSC video carrier frequency. The self resonances of the IF filtering for fullband NTSC video signal, which are stimulated by impulse noise, are near the middle of the IF passband. So, ringing effects caused by impulse noise are less apt to affect baseband video response below 750 kHz if the IF filtering has at least 3 MHz bandwidth.

The SAW filter in the IF amplifier 6 for determining overall IF response for NTSC video highs signal rejects in-channel and adjacent-channel NTSC audio signals, and preferably this SAW filter exhibits a roll-off for the lower 1.75 MHz or so of the 6-MHz-wide TV broadcast channel as translated to the UHF IF band and has substantially linear phase response throughout its passband. The roll-off for the lower 1.75 MHz or so of the 6-MHz-wide TV broadcast channel as translated to intermediate frequencies rejects adjacent-channel NTSC audio signal, the pilot carrier of any co-channel interfering ATSC DTV signal and the in-channel NTSC video carrier. The SAW filter in the IF amplifier 6 preferably exhibits a roll-off for the upper 550 kHz or so of the 6-MHz-wide TV broadcast channel as translated to the UHF IF band and rejects in-channel sound signal.

Figure 8:
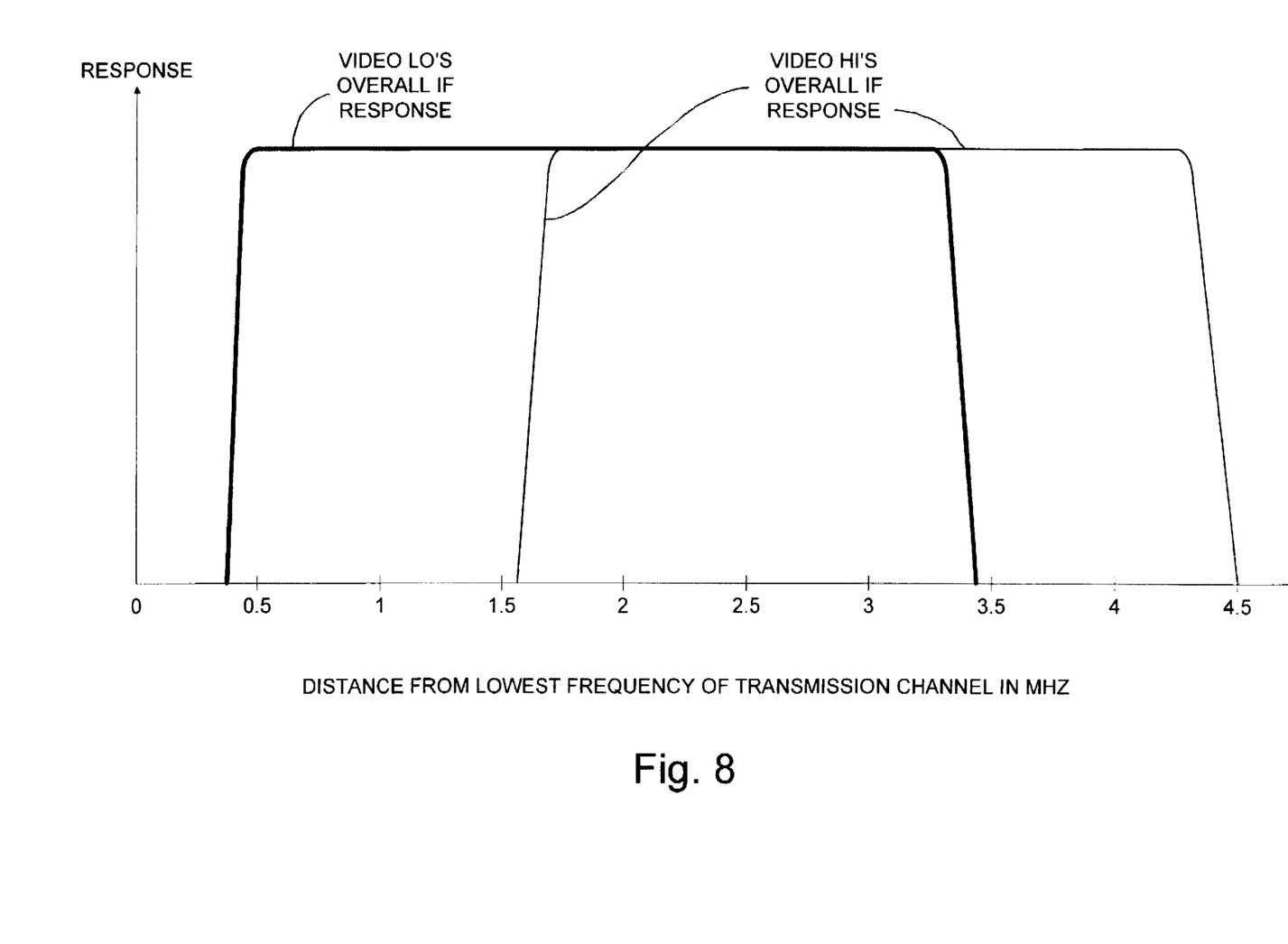
FIG. 8 is a plot of preferred spectral responses for portions of the television receivers of FIGS. 1, 2, 3, 4 and 5.

FIG. 8 shows the desired overall receiver responses, as referred to the lower frequency of the original transmission channel, at the output ports of the UHF IF amplifiers 5 and 6.

The UHF-band IF amplifiers 4, 5 and 6 can include wideband constant-gain amplifiers for driving their component SAW filters from source impedances that minimize multiple reflections and for overcoming the insertion losses of their component SAW filters. The VHF-band IF amplifiers 10, 11 and 12 include respective controlled-gain amplifiers that provide up to 60 dB or more amplification. The VHF-band IF amplifiers 10, 11 and 12 each include stages with forward automatic gain control derived in response to the output signal level of the IF amplifier 11, forward AGC being preferred for the better noise figure it affords. The RF amplifier 2 is provided with delayed reverse automatic gain control in response to the output signal level of the IF amplifier 11.

The response of the VHF IF amplifier 10 is applied to an intercarrier sound detector 13, which supplies 4.5 MHz intercarrier sound intermediate-frequency signals to an intercarrier sound intermediate-frequency amplifier 14 which amplifies and in most designs symmetrically limits the amplified response for application to an FM detector 15. The FM detector 15 reproduces baseband composite audio signal supplied to the sound reproduction portion 16 of the NTSC receiver per conventional practice. The sound reproduction portion 16 of the NTSC receiver typically includes stereophonic decoder circuitry. If the NTSC audio signals are selected with narrowband filtering in the IF amplifiers 4 and 10 that pass only the FM audio carrier as translated to intermediate frequencies, the intercarrier sound detector 13 can be provided by a multiplier that multiplies the IF amplifier 10 response by a video carrier supplied from a third local oscillator in circuitry 17 for synchrodyning the fullband NTSC video signal to baseband.

Alternatively, if the NTSC audio signals are selected with filtering in the IF amplifiers 4 and 10 that passes both the NTSC video and audio carriers as translated to intermediate frequencies, for implementing "quasi-parallel" sound, the intercarrier sound detector 13 can be a simple rectifier or can be a square-law device. A video carrier is then no longer supplied from a third local oscillator in the circuitry 17 for synchrodyning the fullband NTSC video signal to baseband.

Figure 9:
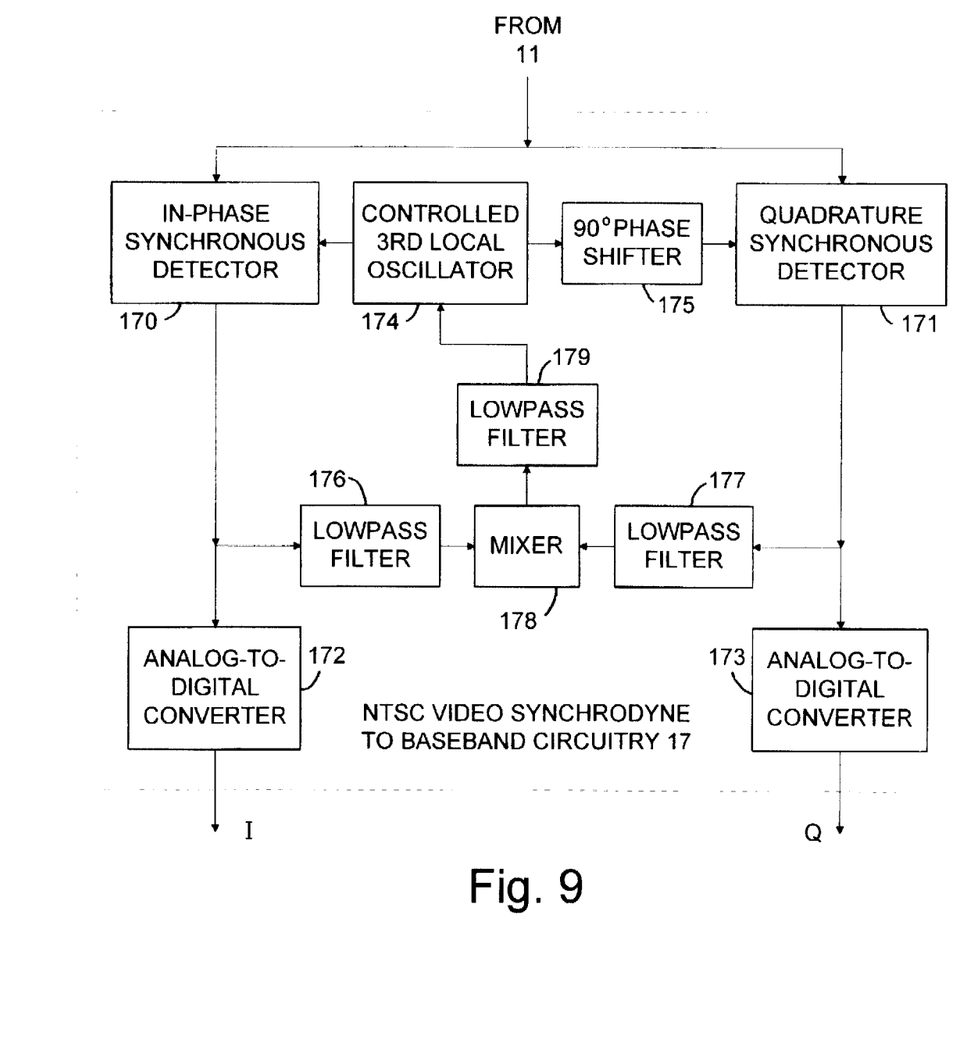
FIG. 9 is a schematic diagram of synchrodyne circuitry as can be employed in any of the television receivers of FIGS. 1, 2, 3, 4, 5, 6 and 7.

Output signal from the VHF IF amplifier 11 is applied to the circuitry 17 for synchrodyning NTSC video carrier modulation to baseband, which circuitry can take the form shown in FIG. 9. Both an in-phase synchronous detector and a quadrature-phase synchronous detector are used in the circuitry 17 for synchrodyning NTSC video carrier modulation to baseband. Synchrodyning is carried out in the analog regime in the specific circuitry 17 for synchrodyning NTSC video carrier modulation to baseband shown in FIG. 9, and the responses of the in-phase synchronous detector 170 and the quadrature-phase synchronous detector 171 used for this purpose are digitized using respective analog-to-digital converters 172 and 173. The third local oscillator 174 in the circuitry 17 supplies oscillations in 0° phasing to the in-phase synchronous detector 170 and supplies oscillations in +90° phasing or in −90° phasing via a phase shift network 175 to the quadrature-phase synchronous detector 171. The third local oscillator 174 is a controlled oscillator provided automatic frequency and phase control (AFPC) signal responsive to the unwanted appearance of low frequency components in the quadrature-phase synchronous detector 171 response. FIG. 9 shows the AFPC signal being generated using the commonplace Costas loop arrangement in which the responses of the in-phase synchronous detector 170 and the quadrature-phase synchronous detector 171 are filtered by lowpass filters 176 and 177, the responses of the lowpass filters 176 and 177 are multiplicatively mixed in a mixer 178, and the resulting product is filtered by a lowpass filter 179 to generate the AFPC signal for the third local oscillator 174.

Alternatively, synchrodyning NTSC video carrier modulation to baseband can be done in the digital regime after converting to a final intermediate-frequency band just above baseband, so the final intermediate-frequency can be digitized. This avoids any problems with the two analog-to-digital converters 172 and 173 differing somewhat in conversion gain.

The digital response Q of the quadrature-phase synchronous detector 171 is the Hilbert transform of the single sideband components of the NTSC signal (i. e., those components above 750 kHz in frequency) plus the artifacts of the DTV signal as they appear in the response I of the in-phase synchronous detector 170. The reader's attention is now directed back to FIG. 1. This Hilbert transform provided by the response Q of the quadrature-phase synchronous detector in the synchrodyne circuitry 17 is phase shifted to provide 90° lag at all frequencies above a few kilohertz by inverse Hilbert transform circuitry 18. Finite-impulse-response digital filters suitable for the inverse Hilbert transform circuitry 18 are known in the digital television receiver art.

The inverse Hilbert transform response of the circuitry 18 is linearly combined in a linear combiner 19 with the digital response I of the in-phase synchronous detector, to generate a luminance signal cutting off somewhat above 750 kHz. This luminance signal is generally free of DTV artifacts, owing to their single-sideband character as referred to NTSC video carrier frequency. Whether the linear combiner 19 is an adder or a subtractor depends on the whether the operation of the quadrature-phase synchronous detector is chosen to lead the operation of the in-phase synchronous detector or to lag it.

Output signal from the VHF IF amplifier 12 is applied to a quadrature-phase synchronous detector 20 for synchrodyning to baseband the NTSC video carrier modulation that is descriptive of the higher-frequency portions of the composite video signal. The quadrature-phase synchronous detector 20 supplies a digital response Q'. By way of example, if quadrature-phase synchronous detection is performed in the analog regime, an analog-to-digital converter is cascaded after the synchronous detector for digitizing its response. Synchronous carrier for the quadrature-phase synchronous detector 20 is supplied from the same source in the circuitry 17 for synchrodyning NTSC video carrier modulation to baseband as supplies the quadrature-phase synchronous detector within the synchrodyne circuitry 17 (e. g., from the phase shift network 175). The response Q' of the quadrature-phase synchronous detector 20 is the Hilbert transform of the single sideband components of the NTSC signal (i. e., those components above 750 kHz in frequency) plus the artifacts of the portion of the DTV signal passed by the SAW filter in the IF amplifier 6. This Hilbert transform provided by the response Q' of the quadrature-phase synchronous detector 20 is phase shifted to provide 90° lag at least at frequencies above 500 kHz or so by inverse Hilbert transform circuitry 21. This procedure generates a response that is the same at higher frequencies as the response of an in-phase NTSC video detector, but which exhibits a low-frequency cut-off that is complementary to the high-frequency cut-off of the linear combiner 19.

A linear combiner 22 combines the responses of the linear combiner 19 and of the quadrature-phase synchronous detector 20 to generate a fullband composite video signal for application to the portion 23 of the NTSC receiver used to reproduce pictures on a viewing screen. This portion 23 of the NTSC receiver typically includes sync separation circuitry and color signal reproduction circuitry; in a combination NTSC and HDTV receiver circuitry will also be included for adapting the 4:3 aspect ratio NTSC image for presentation on a 16:9 viewscreen used for displaying DTV images.

The inverse Hilbert transform circuitry 18 requires a substantial amount of latency (or insertion delay) in order to provide 90° lag for frequencies as low as a few kilohertz. Providing 90° lag for frequencies that are a fraction of horizontal scan line rate means that uncancelled artifacts of DTV signals will be of low enough frequency that receiver AGC will operate to suppress them. Shim delay is necessary in the I signal connection from synchrodyne circuitry 17 to linear combiner 19 for equalizing the latencies of the I and Q signals supplied to the linear combiner 19. Shim delay must be cascaded with the inverse Hilbert transform circuitry 21 to the extent that its latency is less than that of the inverse Hilbert transform circuitry 18. Making the inverse Hilbert transform circuitry 21 the same as the inverse Hilbert transform circuitry 18 is possible to avoid the need for such shimming. When such modification is made, the circuitry can be subjected to a reduction technique that eliminates the need for separate inverse Hilbert transform circuitry 18 and 21.

Figure 2:
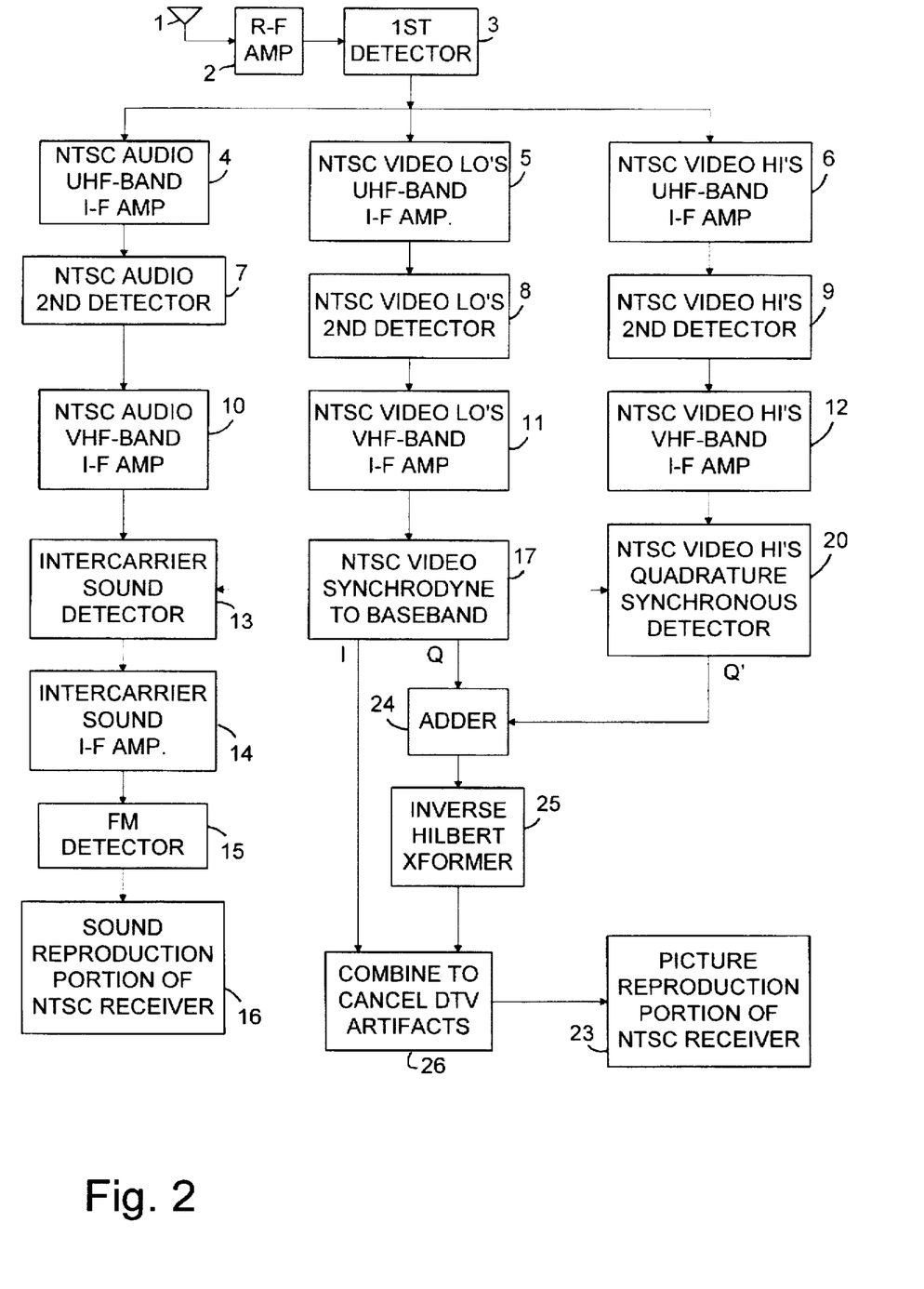

FIG. 2 shows a television receiver that is capable of receiving NTSC analog TV signals as well as DTV signals, which receiver results from such reduction. Elements 18–22 of the FIG. 1 television receiver are replaced by an adder 24 for combining the Q output signal of the synchrodyne circuitry 17 and the Q' output signal of the quadrature synchronous detector 20, inverse Hilbert transform circuitry 25 responsive to the sum output signal from the adder 24, and linear combining circuitry 26 for linearly combining the inverse Hilbert transform circuitry 25 response with the I output signal of the synchrodyne circuitry 17 to generate a luminance signal cutting off somewhat above 750 kHz. This luminance signal is generally free of DTV artifacts, owing to their single-sideband character as referred to NTSC video carrier frequency. If the quadrature synchronous detector 20 and the quadrature synchronous detector within the synchrodyne circuitry 17 are operated out-of-phase with each other, rather than in-phase with each other as presumed, the adder 24 is replaced by a subtractor to achieve equivalent operation.

The synchronous detection of video high frequencies using quadrature-phase video carrier is advantageous in that cross-over between video low frequencies and video high frequencies is automatically correct. Furthermore, cross-over occurs at the highest video frequencies possible so that DTV artifact cancellation extends to as high frequency as possible.

Figure 3:
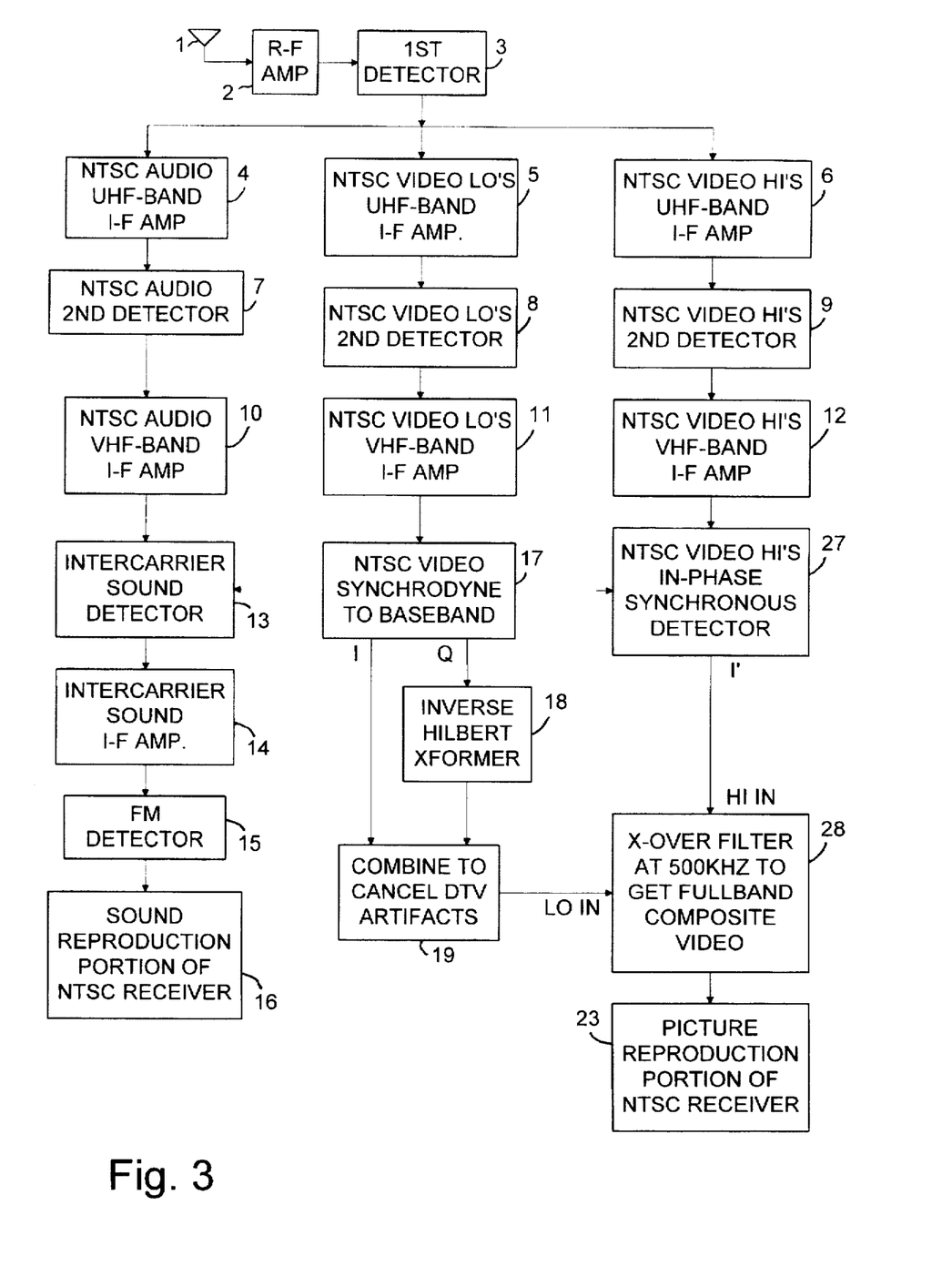

FIG. 3 shows a modification of the FIG. 1 television receiver, which modification uses an in-phase synchronous detector 27 for synchronous detection of video high frequencies, rather than the quadrature-phase synchronous detector 20. The quadrature-phase synchronous detector 20 is dispensed with, together with the inverse Hilbert transform circuitry 21 and the linear combiner 22. A cross-over filter 28 lowpass filters the response of the linear combiner 19 and highpass filters the I' output signal of the in-phase synchronous detector 27 before linearly combining them to generate a fullband NTSC composite video signal for application to the portion 23 of the NTSC receiver used to reproduce pictures on a viewing screen. The cross-over frequency at which the lowpass filtering and highpass filtering cut off in the cross-over filter 28 is preferably at least 500 kHz. The FIG. 2 television receiver is more economical of hardware than the FIG. 3 receiver, since the cross-over filter 28 is not required in the FIG. 2 receiver.

In the FIG. 1, FIG. 2 and FIG. 3 television receivers chroma demodulation circuitry is presumed to be included in the portion 23 of the NTSC receiver used to reproduce pictures on a viewing screen, with chroma signal being separated from the fullband composite video signal applied to that portion 23 of the NTSC receiver used to reproduce pictures on a viewing screen. However, it is possible alternatively to separate chroma signal from the high frequency component of the composite video signal before its combination with the low frequency component of the composite video signal.

Figure 4:
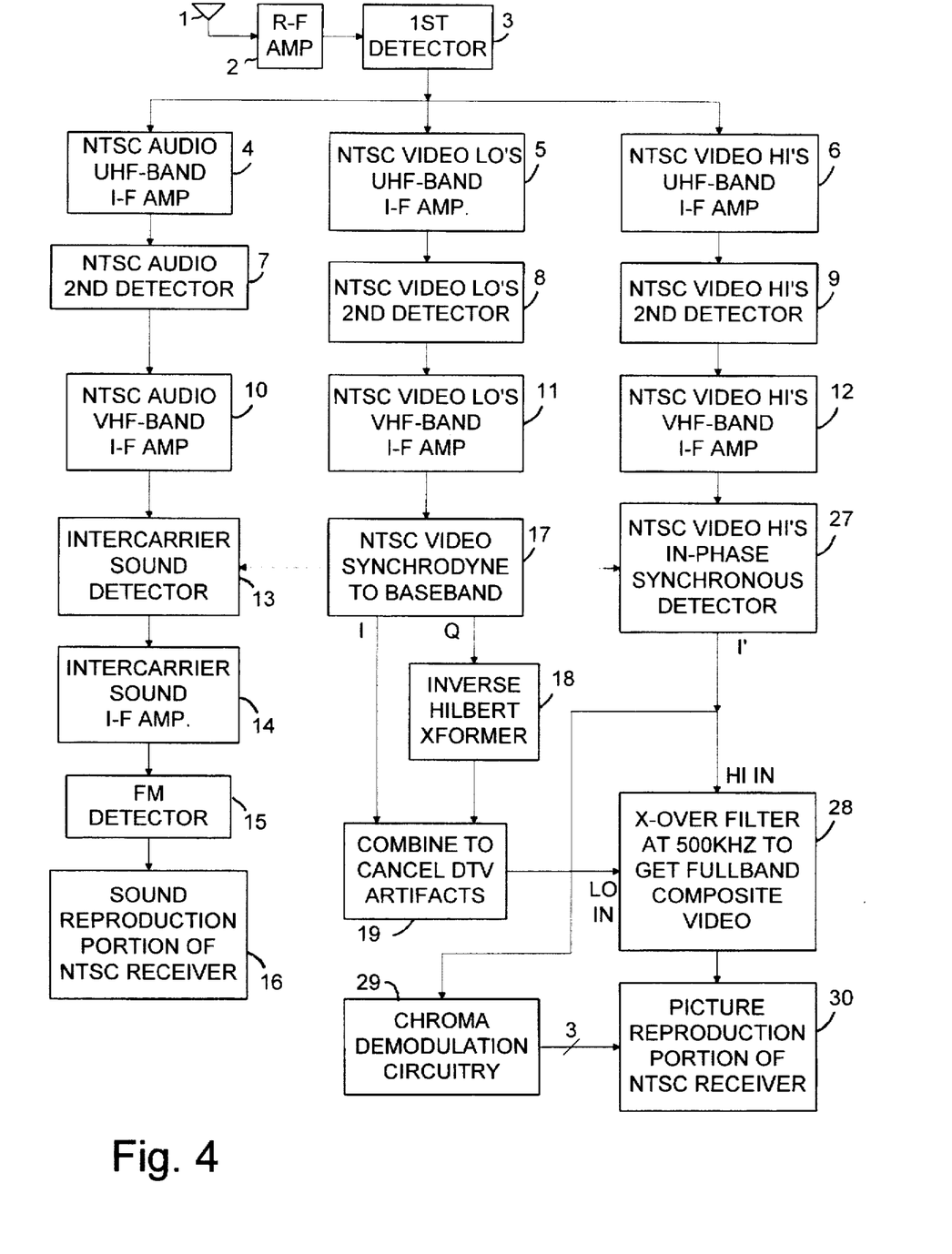

FIG. 4 shows a variant of the FIG. 3 television receiver having conventional chroma demodulation circuitry 29 connected to be directly responsive to the baseband video high frequencies as detected by the in-phase synchronous detector 27. The chroma demodulation circuitry 29 is shown as being separate from a portion 30 of the NTSC receiver used to reproduce pictures on a viewing screen. The chroma demodulation circuitry 29 supplies color difference signals to that portion 30 of the NTSC receiver, which portion 30 receives fullband composite video signal from the cross-over filter 28.

Figure 5:
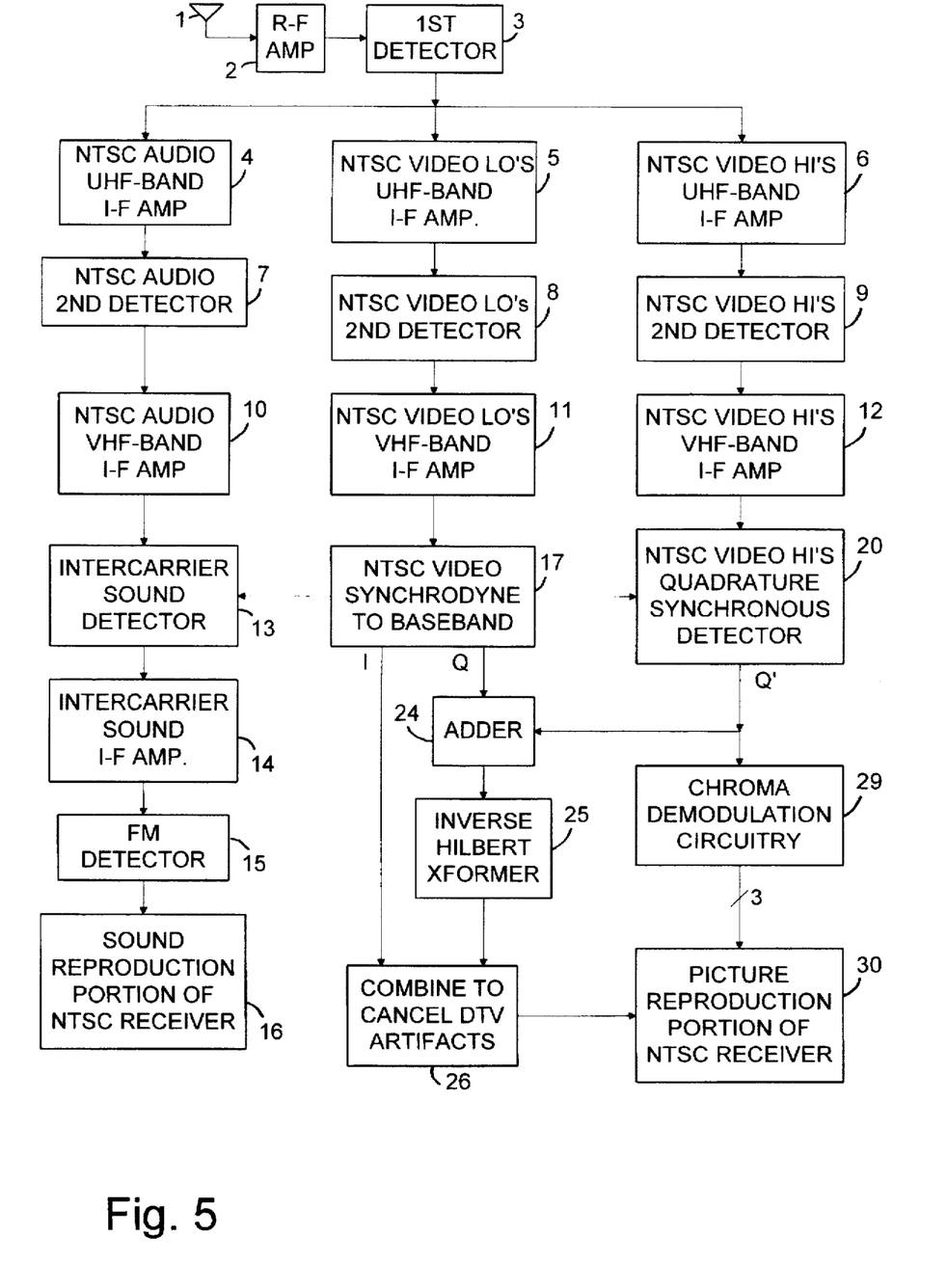

FIG. 5 shows a variant of the FIG. 2 television receiver having chroma demodulation circuitry 29 connected to be directly responsive to the baseband video high frequencies as detected by the quadrature-phase synchronous detector 20. Since color burst like other chroma signal components is phase shifted by 90°, the fact of the Hilbert transform of color signal rather than actual color signal being synchronously detected has no substantial effect on color difference signal recovery.

Figure 6:
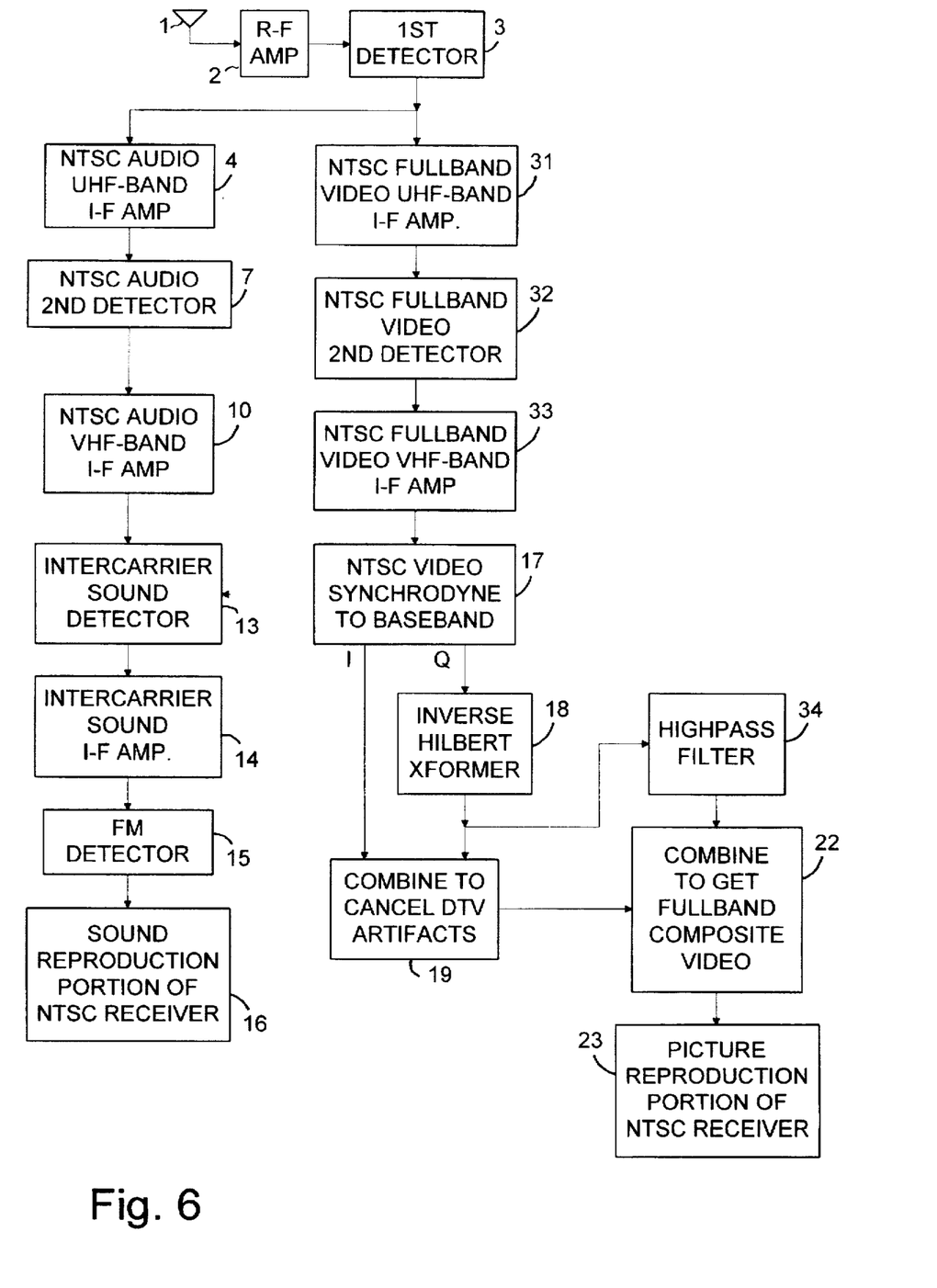
Figure 10:
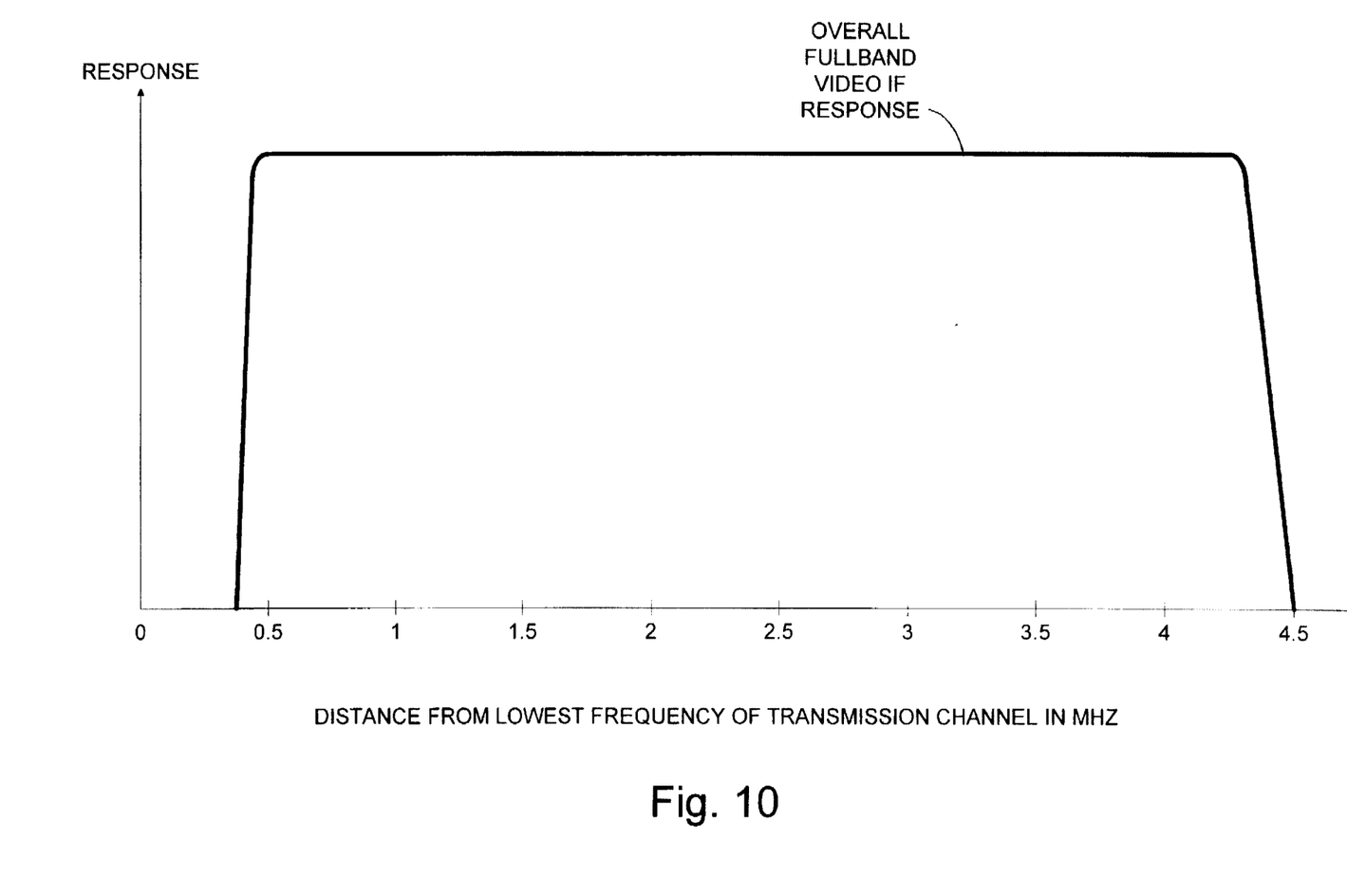
FIG. 10 is a plot of preferred spectral response for a portion of the television receivers of FIGS. 6 and 7.

The FIG. 6 television receiver differs from the FIG. 2 TV receiver in that the UHF-band IF amplifier 5 is replaced by a UHF-band IF amplifier 31 with a passband for the complete frequency spectrum of the VSB AM NTSC video carrier modulation, the NTSC video lows second detector 8 is replaced by a second detector 32 for the complete frequency spectrum of the VSB AM NTSC video carrier modulation, and the VHF-band IF amplifier 11 is replaced by a VHF-band IF amplifier 33 with a passband for the complete frequency spectrum of the VSB AM NTSC video carrier modulation. FIG. 10 shows the desired overall receiver response, as referred to the lower frequency of the original transmission channel, at the output port of the UHF IF amplifier 33. This full bandwidth response permits the UHF-band IF amplifier 6, the NTSC video highs second detector 9, the VHF-band IF amplifier 12, the NTSC video highs quadrature synchronous detector 20, and the inverse Hilbert transform circuitry 21 to be dispensed with entirely. Instead, a highpass filter 34 extracts video high frequencies from the response of the inverse Hilbert transform circuitry 18 for application to the linear combiner 22, there to be linearly combined with the video low frequencies supplied from the linear combiner 19.

Figure 7:
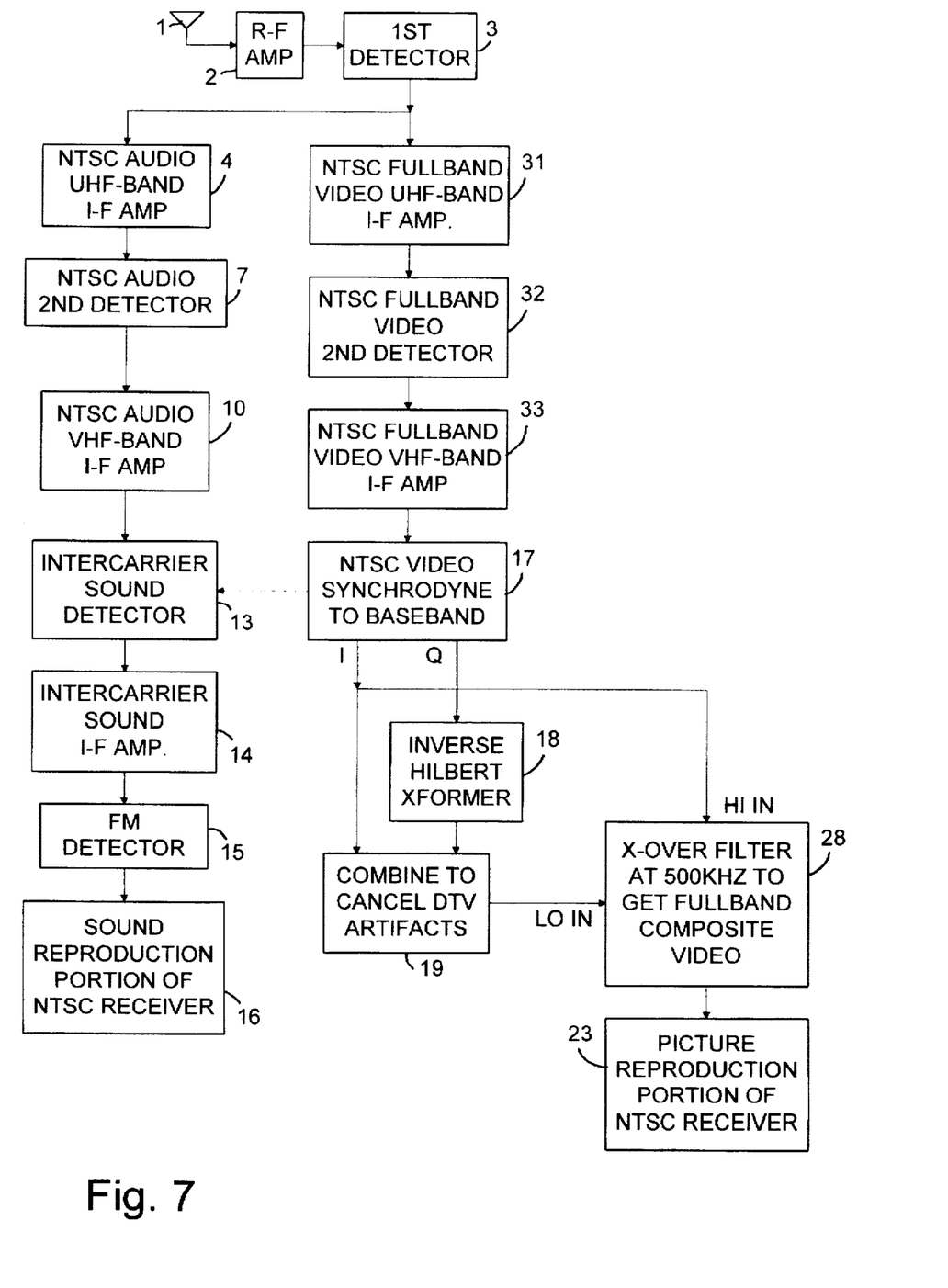

The FIG. 7 television receiver differs from the FIG. 3 TV receiver in that the UHF-band IF amplifier 5 is replaced by a UHF-band IF amplifier 31 with a passband for the complete frequency spectrum of the VSB AM NTSC video carrier modulation, the NTSC video lows second detector 8 is replaced by a second detector 32 for the complete frequency spectrum of the VSB AM NTSC video carrier modulation, and the VHF-band IF amplifier 11 is replaced by a VHF-band IF amplifier 33 with a passband for the complete frequency spectrum of the VSB AM NTSC video carrier modulation. FIG. 10 shows the desired overall receiver response, as referred to the lower frequency of the original transmission channel, at the output port of the UHF IF amplifier 33. This full bandwidth response permits the UHF-band IF amplifier 6, the NTSC video highs second detector 9, the VHF-band IF amplifier 12 and the NTSC video highs in-phase synchronous detector 27 to be dispensed with entirely. Instead, the response I of the in-phase synchronous detector in the synchrodyne circuitry 17 is applied to the cross-over filter 28 to supply it with video high frequencies.

In variants of the FIG. 1 TV receiver, chroma demodulation circuitry can be arranged to directly respond to the response of the quadrature-phase synchronous detector 20 or of the inverse Hilbert transform circuitry 21. In variants of the FIG. 6 and FIG. 7 TV receivers, chroma demodulation circuitry can be arranged to directly respond to either the I output signal or the Q output signal of the synchrodyne circuitry 17 or to directly respond to the response of the inverse Hilbert transform circuitry 18; these arrangements are possible in the FIG. 1, FIG. 2 and FIG. 3 TV receivers as well, if their video lows IF amplifiers are modified to have an overall fullband response as shown in FIGURE 10.

The effect of artifacts of co-channel interfering digital signal on chroma demodulation results can (like other forms of random noise) be reduced by transversal filtering, since digital television signals are random from scan line to scan line while chrominance signals tend to exhibit strong line-to-line anticorrelation before demodulation and strong line-to-line correlation after demodulation. An NTSC receiver as described above can be incorporated into a digital television receiver as described in patent application Ser. No. 08/821, 944 filed by the inventor 21 Mar. 1997 and entitled "USING VIDEO SIGNALS FROM AUXILIARY ANALOG TV RECEIVERS FOR DETECTING NTSC INTERFERENCE IN DIGITAL TV RECEIVERS". Modifications of the television receivers thusfar disclosed to use PAL or SECAM signals rather than NTSC signals are easily effected by one skilled in the art of television receiver design when acquainted with the foregoing disclosure. While the foregoing disclosure describes NTSC television receivers that reproduce sound and picture, the invention has application to NTSC television receivers that do not reproduce sound and picture, such as those incorporated into video tape recorders or into NTSC signal cancellation filters for digital television receivers. One skilled in the art of television receiver design when acquainted with the foregoing to disclosure will be enabled to design many variants of the receivers described as preferred embodiments, and this should be borne in mind when determining the scopes of the claims which follow.

What is claimed is:

1. A video signal receiver with reduced sensitivity to interference from co-channel digital television signals, said video signal receiver comprising:

first input circuitry for selecting a vestigial sideband amplitude-modulation signal descriptive of a video signal, converting the selected vestigial sideband amplitude-modulation signal to a first intermediate frequency signal, and amplifying said first intermediate frequency signal to provide an amplified first intermediate frequency signal, said vestigial sideband amplitude-modulation signal as originally received by said first input circuitry including a video carrier and full sideband in addition to a vestigial sideband, the selection of said vestigial sideband amplitude-modulation signal being from any single one of a plurality of channels at least one of which is subject to containing at times co-channel interference from a digital television signal;

video synchrodyning circuitry for synchronously detecting said amplified first intermediate frequency signal with respect to said video carrier signal and with respect to a carrier in quadrature phase with said video carrier signal, for generating a first in-phase synchronous detection response and for generating a first quadrature-phase synchronous detection response;

first phase shift circuitry for phase shifting by substantially 90° all frequency components of said first quadrature-phase synchronous detection response above a prescribed frequency to generate a first phase shift circuitry response; and first linear combining circuitry linearly combining said first in-phase synchronous detection response and said first phase shift circuitry response for recovering lower frequency portions of said video signal described both in said full sideband and said vestigial sideband, substantially free of artifacts from any co-channel interfering digital television signal.

2. A video signal receiver as set forth in claim 1, wherein said input circuitry selects said vestigial sideband amplitude-modulation signal descriptive of a video signal so as to include the entirety of said vestigial sideband and a portion of said full sideband extending up to at least 1.75 MHz from video carrier.

3. A video signal receiver as set forth in claim 2, further comprising:

circuitry for recovering higher frequency portions of said video signal described in said full sideband but not in said vestigial sideband; and second linear combining circuitry for recovering said video signal by linearly combining said lower frequency portions of said video signal and said higher frequency portions of said video signal.

4. A video signal receiver as set forth in claim 3, wherein said circuitry for recovering higher frequency portions of said video signal comprises:

second input circuitry for selecting a portion of said full sideband of said vestigial sideband amplitude-modulation signal, converting the selected portion to a second intermediate frequency signal, and amplifying said second intermediate frequency signal to provide an amplified second intermediate frequency signal;

a synchronous detector for synchronously detecting said amplified second intermediate frequency signal with respect to said carrier in quadrature phase with said video carrier signal, for generating a second quadrature-phase synchronous detection response; and second phase shift circuitry for phase shifting by substantially 90° all frequency components of said second quadrature-phase synchronous detection response above a prescribed frequency to generate a second phase shift circuitry response for recovering said higher frequency portions of said video signal.

5. A video signal receiver as set forth in claim 2, further comprising:

second input circuitry for selecting a portion of said full sideband of said vestigial sideband amplitude-modulation signal, converting the selected portion to a second intermediate frequency signal, and amplifying said second intermediate frequency signal to provide an amplified second intermediate frequency signal;

a synchronous detector for synchronously detecting said amplified second intermediate frequency signal with respect to said carrier in quadrature phase with said video carrier signal, for generating a second quadrature-phase synchronous detection response; and an adder for adding said second quadrature-phase synchronous detection response to said first quadrature-phase synchronous detection response for application to said first phase shift circuitry, said first phase shift circuitry being operative for phase shifting by substantially 90° all frequency components of both said first and said second quadrature-phase synchronous detection responses above a prescribed frequency to generate said first phase shift circuitry response; which said first phase shift circuitry response conditions said first linear combining circuitry for recovering, in addition to said lower frequency of said video signal described both in said full sideband and said vestigial sideband, higher frequency portions of said video signal described in said full sideband but not in said vestigial sideband.

6. A video signal receiver as set forth in claim 2, further comprising:

second input circuitry for selecting a portion of said full sideband of said vestigial sideband amplitude-modulation signal, converting the selected portion to a second intermediate frequency signal, and amplifying said second intermediate frequency signal to provide an amplified second intermediate frequency signal;

a synchronous detector for synchronously detecting said amplified second intermediate frequency signal with respect to said video carrier signal, for generating a second in-phase synchronous detection response for recovering said higher frequency portions of said video signal; and a cross-over filter for recovering said video signal by combining said lower frequency portions of said video signal and said higher frequency portions of said video signal.

7. A video signal receiver as set forth in claim 1, further comprising:

circuitry for recovering higher frequency portions of said video signal described in said full sideband but not in said vestigial sideband; and second linear combining circuitry for recovering said video signal by linearly combining said lower frequency portions of said video signal and said higher frequency portions of said video signal.

8. A video signal receiver as set forth in claim 7, wherein said circuitry for recovering higher frequency portions of said video signal comprises:

second input circuitry for selecting a portion of said full sideband of said vestigial sideband amplitude-modulation signal, converting the selected portion to a second intermediate frequency signal, and amplifying said second intermediate frequency signal to provide an amplified second intermediate frequency signal;

a synchronous detector for synchronously detecting said amplified second intermediate frequency signal with respect to said carrier in quadrature phase with said video carrier signal, for generating a second quadrature-phase synchronous detection response; and second phase shift circuitry for phase shifting by substantially 90° all frequency components of said second quadrature-phase synchronous detection response above a prescribed frequency to generate a second phase shift circuitry response for recovering said higher frequency portions of said video signal.

9. A video signal receiver as set forth in claim 1, further comprising:

second input circuitry for selecting a portion of said fall sideband of said vestigial sideband amplitude-modulation signal, converting the selected portion to a second intermediate frequency signal, and amplifying said second intermediate frequency signal to provide an amplified second intermediate frequency signal;

a synchronous detector for synchronously detecting said amplified second intermediate frequency signal with respect to said carrier in quadrature phase with said video carrier signal, for generating a second quadrature-phase synchronous detection response; and an adder for adding said second quadrature-phase synchronous detection response to said first quadrature-phase synchronous detection response for application to said first phase shift circuitry, said first phase shift circuitry being operative for phase shifting by substantially 90° all frequency components of both said first and said second quadrature-phase synchronous detection responses above a prescribed frequency to generate said first phase shift circuitry response; which said first phase shift circuitry response conditions said first linear combining circuitry for recovering, in addition to said lower frequency of said video signal described both in said full sideband and said vestigial sideband, higher frequency portions of said video signal described in said full sideband but not in said vestigial sideband.

10. A video signal receiver as set forth in claim 1, further comprising:

second input circuitry for selecting a portion of said full sideband of said vestigial sideband amplitude-modulation signal, converting the selected portion to a second intermediate frequency signal, and amplifying said second intermediate frequency signal to provide an amplified second intermediate frequency signal;

a synchronous detector for synchronously detecting said amplified second intermediate frequency signal with respect to said video carrier signal, for generating a second in-phase synchronous detection response for recovering said higher frequency portions of said video signal; and a cross-over filter for recovering said video signal by combining said lower frequency portions of said video signal and said higher frequency portions of said video signal.

11. A video signal receiver as set forth in claim 1, wherein said input circuitry selects the entirety of said vestigial sideband amplitude-modulation signal descriptive of a video signal but rejects accompanying in-channel sound signal and the pilot carrier of any co-channel interfering digital video signal.

12. A video signal receiver as set forth in claim 11, further comprising:

a high pass filter supplying a highpass filter response to said first phase shift circuitry response; and second linear combining circuitry for recovering said video signal by linearly combining said lower frequency portions of said video signal and said highpass filter response to said first phase shift circuitry response.

13. A video signal receiver as set forth in claim 11, further comprising:

a cross-over filter for recovering said video signal by combining said lower frequency portions of said video signal with higher frequency portions of said video signal taken from said first in-phase synchronous detection response.

14. A video signal receiver as set forth in claim 1 of plural-conversion type, wherein said first input circuitry comprises:

a first detector for selecting a single one of said plurality of channels and converting an NTSC signal therein to an ultra-high-frequency intermediate-frequency signal;

a first amplifier providing frequency selective amplification for a portion of said ultra-high-frequency intermediate-frequency signal, to generate a first amplifier response comprising responses to said vestigial sideband, said video carrier and at least a portion of said full sideband descriptive of the lower frequency portions of said video signal;

a second detector for converting said first amplifier response to a first very-high-frequency intermediate-frequency signal;

a second amplifier providing frequency selective amplification for said first very-high-frequency intermediate-frequency signal, to generate a second amplifier response supplied as the output signal from said first input circuitry to said video synchrodyning circuitry and comprising responses to said vestigial sideband, said video carrier and at least a portion of said full sideband descriptive of the lower frequency portions of said video signal.

15. A video signal receiver as set forth in claim 14, further comprising, as components of second input circuitry including said first detector:

a third amplifier providing frequency selective amplification for a portion of said ultra-high-frequency intermediate-frequency signal, to generate a third amplifier response only to a portion of said full sideband;

a further second detector for converting said third amplifier response to a second very-high-frequency intermediate-frequency signal;

a fourth amplifier providing frequency selective amplification for said second very-high-frequency intermediate-frequency signal, to generate a fourth amplifier response only to a portion of said fall sideband, supplied as the output signal from said second input circuitry.

16. A video signal receiver as set forth in claim 15, further comprising:

a synchronous detector for synchronously detecting said fourth amplifier response with respect to said carrier in quadrature phase with said video carrier signal, for generating a second quadrature-phase synchronous detection response;

second phase shift circuitry for phase shifting by substantially 90° all frequency components of said second quadrature-phase synchronous detection response above a prescribed frequency to generate a second phase shift circuitry response for recovering higher frequency portions of said video signal; and second linear combining circuitry for recovering said video signal by linearly combining said lower frequency portions of said video signal and said higher frequency portions of said video signal.

17. A video signal receiver as set forth in claim 15, further comprising:

a synchronous detector for synchronously detecting said fourth amplifier response with respect to said carrier in quadrature phase with said video carrier signal, for generating a second quadrature-phase synchronous detection response; and an adder for adding said second quadrature-phase synchronous detection response to said first quadrature-phase synchronous detection response for application to said first phase shift circuitry, said first phase shift circuitry being operative for phase shifting by substantially 90° all frequency components of both said first and said second quadrature-phase synchronous detection responses above a prescribed frequency to generate said first phase shift circuitry response; which said first phase shift circuitry response conditions said first linear combining circuitry for recovering, in addition to said lower frequency of said video signal described both in said full sideband and said vestigial sideband, higher frequency portions of said video signal described in said full sideband but not in said vestigial sideband.

18. A video signal receiver as set forth in claim 15, further comprising:

a synchronous detector for synchronously detecting said fourth amplifier response with respect to said video carrier signal, for generating a second in-phase synchronous detection response for recovering higher frequency portions of said video signal; and a cross-over filter for recovering said video signal by combining said lower frequency portions of said video signal and said higher frequency portions of said video signal.

19. A video signal receiver as set forth in claim 14, further comprising:

a high pass filter supplying a highpass filter response to said first phase shift circuitry response; and second linear combining circuitry for recovering said video signal by linearly combining said lower frequency portions of said video signal and said highpass filter response to said first phase shift circuitry response.

20. A video signal receiver as set forth in claim 14, further comprising:

a cross-over filter for recovering said video signal by combining said lower frequency portions of said video signal with higher frequency portions of said video signal taken from said first in-phase synchronous detection response.

* * * * *